United States Patent [19]

Tahara et al.

[11] Patent Number: 4,858,468

[45] Date of Patent: Aug. 22, 1989

[54] METHOD OF DETECTING REMAINING QUANTITY OF REPLENISHING SOLUTION

[75] Inventors: Toshiro Tahara; Mikio Takahashi, both of Tokyo, Japan

[73] Assignee: Fuji Photo Film Co., Ltd., Kanagawa, Japan

[21] Appl. No.: 205,699

[22] Filed: Jun. 13, 1988

[30] Foreign Application Priority Data

Jun. 17, 1987 [JP] Japan ................................ 62-150402
Jun. 17, 1987 [JP] Japan ................................ 62-150399

[51] Int. Cl.$^4$ ............................................. G01F 23/00
[52] U.S. Cl. .................................. 73/149; 73/290 R; 340/618; 364/564
[58] Field of Search ............. 73/149, 290 R; 364/509, 364/560–564; 340/618

[56] References Cited

U.S. PATENT DOCUMENTS

| 3,377,859 | 4/1968 | Sanders | 73/290 R |
| 3,874,236 | 4/1975 | Reck | 73/290 V |
| 4,339,950 | 7/1982 | Lendino | 73/310 |

FOREIGN PATENT DOCUMENTS

| 96254 | 12/1983 | European Pat. Off. | 340/618 |
| 172245 | 10/1982 | Japan | 340/618 |
| 201664 | 12/1982 | Japan | 340/618 |
| 53724 | 3/1983 | Japan | 340/618 |
| 185134 | 9/1985 | Japan | 73/290 R |

OTHER PUBLICATIONS

"Computer Inventories Oil in Refinery Tanks"; *Electronics;* vol. 30, No. 10, Oct. 1957, pp. 143–147; D. J. Gimpel et al.

Primary Examiner—Tom Noland
Attorney, Agent, or Firm—Sughrue, Mion, Zinn, Macpeak & Seas

[57] ABSTRACT

A method of detecting the quantity of replenishing solution remaining in a replenishing-solution tank in an automatic developing machine, which tank stores a replenishing solution to be supplied to a processing tank for processing a light sensitive material, comprises the steps of subtracting the quantity of replenishing solution supplied to the processing tank from a storage quantity representing the amount of replenishing solution stored in the replenishing-solution tank; and detecting the value of the subtraction as the quantity of replenishing solution remaining in the replenishing-solution tank. Accordingly, an operator can detect the remaining quantity of replenishing solution without the need to visually inspect the replenishing-solution tank.

17 Claims, 8 Drawing Sheets

METHOD OF DETECTING REMAINING QUANTITY OF REPLENISHING SOLUTION

BACKGROUND OF THE INVENTION

1. Field of the Invention:

The present invention relates to a method of detecting the quantity of replenishing solution remaining in a replenishing-solution tank by performing calculations based on the quantity of light sensitive material processed.

2. Description of the Related Art:

Automatic developing machines are in general arranged in such a manner that a light sensitive material which has been exposed is passed through a developing tank, a fixing tank, and a washing tank and is discharged after drying. In this case, after the light sensitive material has been immersed, for example, in the developer in the developing tank, the light sensitive material is fed to the next fixing tank, with a portion of the developer adhering to the surface of the light sensitive material. As a result, the quantity of developer decreases in accordance with the quantity of light sensitive material processed. In addition, since the developer gradually deteriorates due to the processing of light sensitive material and the aging of the developer itself, it is necessary to periodically supply a replenishing solution containing a large amount of developing agent.

Such an automatic developing machine is provided with a replenishing-solution tank which communicates with the developing tank through a pipe, and the replenishing solution can be supplied to the developing tank by the driving of the pump. More specifically, a previously prepared replenishing solution which is stored in the replenishing-solution tank is supplied as required to the developing tank by the driving of the pump. Therefore, an operator can easily perform the operation of supplying a replenishing solution without the need to prepare the replenishing solution for each supply thereof.

In general, since the replenishing-solution tank is limited in volume, the operator needs to confirm the quantity of replenishing solution remaining in the replenishing-solution tank and, if the remaining quantity of replenishing solution is small, he must prepare the replenishing solution and supply it to the replenishing-solution tank. For this reason, the replenishing-solution tank is commonly made of a transparent or translucent material which permits the liquid level in the replenishing-solution tank to be viewed from the exterior, and the replenishing-solution tank is provided with a plurality of equally spaced cuts parallel to the liquid level. Accordingly, the operator can readily detect the quantity of replenishing solution remaining in the replenishing-solution tank.

However, such a structure of the replenishing-solution tank has involved the problem that, when the replenishing-solution tank itself is contaminated, the operator may have difficulty in identifying the liquid level and there is a possibility that he may misread the remaining quantity. In addition, in order to facilitate confirmation of the remaining quantity, at least a portion of the replenishing-solution tank must be exposed to the exterior of the automatic developing machine. Furthermore, since cuts must be formed in the replenishing-solution tank, the production of such replenishing-solution tanks requires complicated processes.

To obviate the problems, a structure has been proposed in which the minimum liquid level (a lower level) at least to which a replenishing solution must be charged into the replenishing-solution tank is set and a sensor for detecting the fact that the quantity of replenishing solution has reached the lower level is incorporated, whereby an alarm generates an alarm sound when the sensor has detected that fact (alarm structure). When an operator confirms the alarm sound generated by the alarm, he prepares a predetermined quantity of replenishing solution and supplies it to the replenishing-solution tank. Thus, the replenishing solution is prevented from running short in the replenishing-solution tank.

However, such an alarm structure involves a small time lag between the starting of operation of the alarm and the starting of supply of the replenishing solution to the replenishing-solution tank, and the replenishing solution may be supplied to the developing tank during the period of the time lag as well. For this reason, even if the predetermined quantity of replenishing solution is supplied to the replenishing-resolution tank after the operation of the alarm, the quantity of replenishing solution in the replenishing-solution tank may actually not reach the upper level. In such an alarm structure, even if it is desired to fully charge the replenishing-solution tank (for example, in the absence of an operator and during a 24-hour continuous operation of the automatic developing machine), it is impossible to confirm an accurate remaining quantity in the replenishing-solution tank. Accordingly, it is necessary to prepare a replenishing-solution tank having a complicated structure, such as one provided with a reservoir pipe.

SUMMARY OF THE INVENTION

It is therefore an object of the present invention to provide a method of detecting the remaining quantity of replenishing solution, which method enables detection of the quantity of replenishing solution remaining in the replenishing-solution tank without the need to expose the replenishing-solution tank to the exterior of an automatic developing machine.

To achieve the above and other objects, in accordance with the present invention, there is provided a method of detecting the quantity of replenishing solution remaining in a replenishing-solution tank in an automatic developing machine, which tank is adapted to supply a replenishing solution to a processing tank for processing a light sensitive material, comprising the steps of subtracting the quantity of replenishing solution supplied to the processing tank from a storage quantity representing the amount of replenishing solution stored in the replenishing-solution tank; and detecting the value of the subtraction as the quantity of replenishing solution remaining in the replenishing-solution tank.

In accordance with the present invention, the quantity of replenishing solution remaining is detected by subtracting the quantity representing the amount of replenishing solution supplied to the processing tank in accordance with the quantity representing the amount of light sensitive material processed from the storage quantity representing the amount of replenishing solution stored in the replenishing-solution tank. The remaining quantity thus detected can be displayed. Such a display may be provided by a so-called analog display device in which an indicating needle moves over an equally graduated scale or a so-called digital display device which displays the remaining quantity of replenishing solution in the form of numerical figures. An operator can always detect the quantity of replenishing solution remaining in the replenishing-solution tank by subtracting the quantity of replenishing solution supplied to the processing tank from the storage quantity representing the amount of replenishing solution stored, and this improves the operability of film processing. In addition, since it is unnecessary to expose the replenishing-solution tank itself to the exterior of the automatic developing machine, the freedom of design of the layout of the replenishing-solution tank widens, so that the automatic developing machine can be made compact.

In one embodiment of the present invention, the storage quantity representing the amount of replenishing solution stored in the replenishing-solution tank is obtained in the following manner. The replenishing solution is supplied to a predetermined lower level in the replenishing-solution tank, and thereafter a predetermined quantity of replenishing solution is supplied to the replenishing-solution tank. The resultant quantity of replenishing solution is set as the storage quantity of replenishing solution stored in the replenishing-solution tank.

In this manner, it is possible to easily obtain an initial value of the quantity of replenishing solution stored in the replenishing-solution tank.

BRIEF DESCRIPTION OF THE DRAWINGS

A better understanding of the present invention may be gained from the following detailed description, when read in connection with the accompanying drawings, in which.

DESCRIPTION OF THE PREFERRED EMBODIMENT

Figure 1:
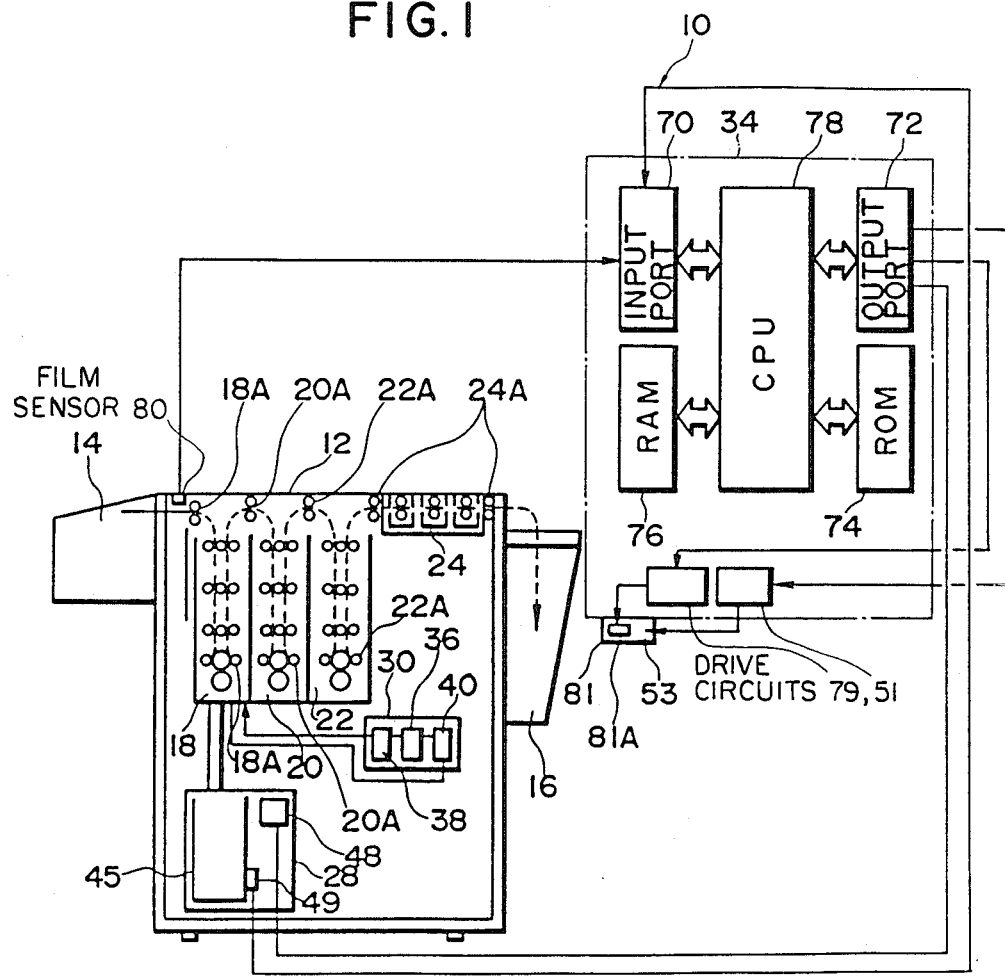
FIG. 1 is a view showing the diagrammatic construction of an automatic developing machine to which the present invention is applied.

A preferred embodiment of the present invention will be described in detail below with reference to the accompanying drawings. FIG. 1 shows an automatic developing machine 10 according to the embodiment of the present invention.

The automatic developing machine 10 according to the presently preferred embodiment is provided with the functions of developing, fixing, washing and drying an unprocessed film.

The outer wall of the automatic developing machine 10 is constituted by a box 12, and a film insertion table 14 for allowing insertion of unprocessed films is disposed at an upper portion of the front of the box 12, with a film stocker 16 for storing processed films being disposed at an upper portion of the rear of the box 12. A film sensor 80 for detecting the passage of films is mounted in the vicinity of an insertion opening which is formed, for insertion of an unprocessed film, in the portion of the box 12 on which the film insertion table 14 is mounted.

The film sensor 80 includes a plurality of light emitting elements for emitting infrared rays outside of the region of sensitizing wavelengths which can cause photographic sensitization, and the light emitting elements are arranged in opposition to and parallel to the widthwise direction of a film. Corresponding light receiving elements are each turned on and off in accordance with the width of an inserted film and output a signal based on this width. The film sensor 80 may be of a type which is tuned on and off when the light receiving elements have received the light of the light emitting elements reflected from a film which has been inserted. Otherwise, the film sensor 80 may be constituted by a mechanical sensor.

In the interior of the box 12, a developing tank 18, a fixing tank 20, a washing tank 22 and a drying section 24 are arranged in this order. The box 12 further includes a solution supplying device 28, a solution circulating device 30 and a control section 34.

The developing tank 18, the fixing tank 20, the washing tank 22 and the drying section 24 are arranged in the order of film processing and respectively include a plurality of guide rollers 18A, 20A, 22A and 24A for feeding an unprocessed film therealong. The plurality of guide rollers 18A, 20A, 22A and 24A constitute a passageway along which a film is fed, and the film is fed at a predetermined speed by the rotation of the guide rollers.

Figure 2:
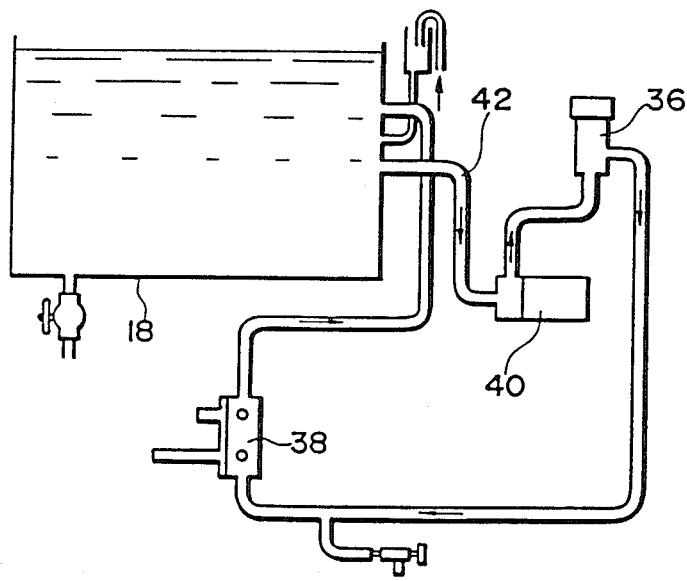
FIG. 2 is a diagram showing the piping of the circulating device used in the present invention.

As shown in detail in FIG. 2, the solution circulating device 30 disposed in the interior of the box 12 includes a developer filter 36, a heat exchanger 38 and a circulating pump 40. A pipe 42 provides communication between the circulating pump 40 and the developing tank 18, and the developer filter 36 communicates with the developing tank 18 through the heat exchanger 38.

Figure 3:
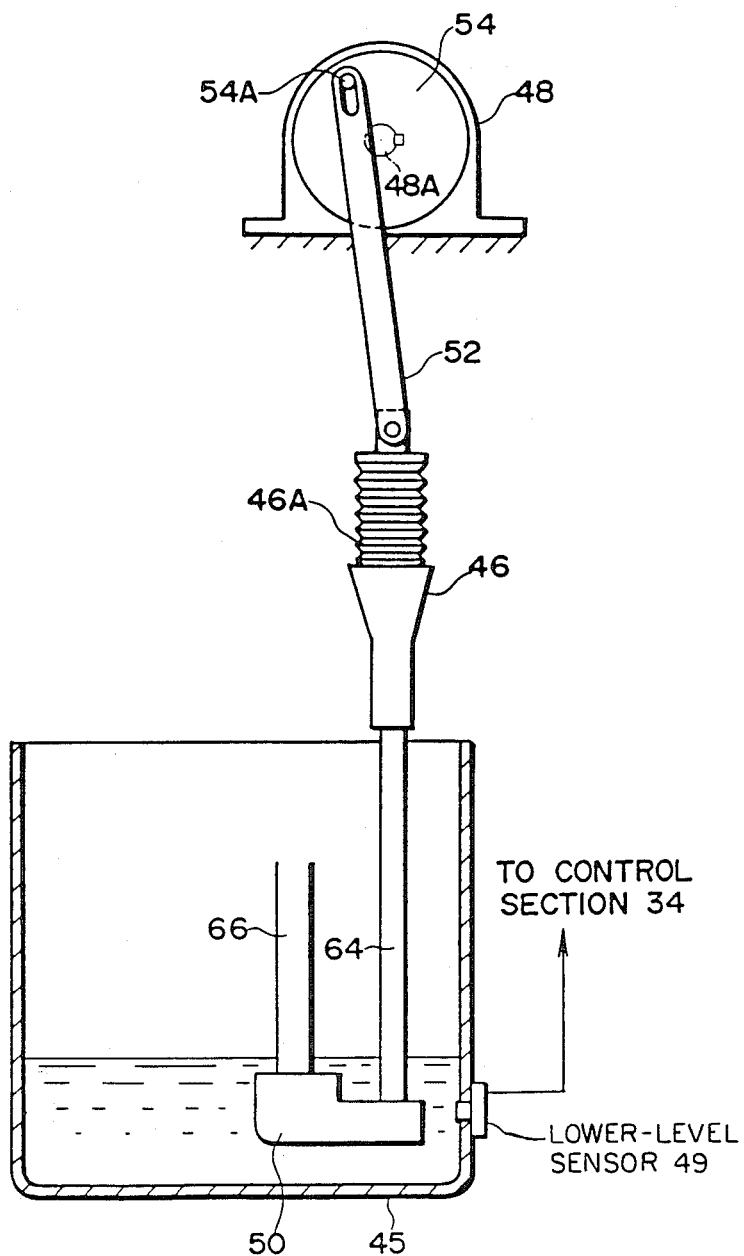
FIG. 3 is a schematic view showing the diagrammatic construction of the bellows pump used in the present invention.

As shown in FIG. 3, the solution supplying device 28 includes a replenishing-solution tank 45 for storing a replenishing solution, a bellows pump 46, and a motor 48. A lower-level sensor 49 for detecting the lower level of the replenishing solution is attached to the replenishing-solution tank 45. The lower-level sensor 49 is adapted to supply a signal to the control section 34 when the replenishing solution has decreased to the lower level in the replenishing-solution tank 45. An alarm 53 is connected to the control section 34 through a drive circuit 51 and, in response to the signal, the control section 34 operates the alarm 53 to generate an alarm sound. The lower level is preferably selected so that at least the replenishing-solution tank 45 will not be empty during the time that an operator who has noted the alarm sound takes to prepare a predetermined quantity of replenishing solution and to supply it to the replenishing-solution tank 45.

A predetermined quantity of replenishing solution is initially supplied to a level above the lower level in the replenishing-solution tank 45, and a level corresponding to a quantity P of replenishing solution thus stored (the value obtained when the aforesaid predetermined quantity is added to the quantity of replenishing solution corresponding to the lower level) is determined as an upper level which is stored in the control section 34. The quantity of replenishing solution that corresponds to the upper level is hereinafter referred to as a "storage quantity".

A bellows 46A is interlockingly connected at one end thereof to one end of a connecting rod 52 which constitutes a crank mechanism. The other end of the bellows 46A is connected by a pipe 64 to a replenishing-solution sucking portion 50 in the replenishing solution charged in the replenishing-solution tank 45. The other end of the connecting rod 52 is rotatably supported by an eccentric shaft 54A which is fixed at a position offset from the center of a rotating disk 54 mounted to the output shaft 48A of the motor 48.

Figure 4:
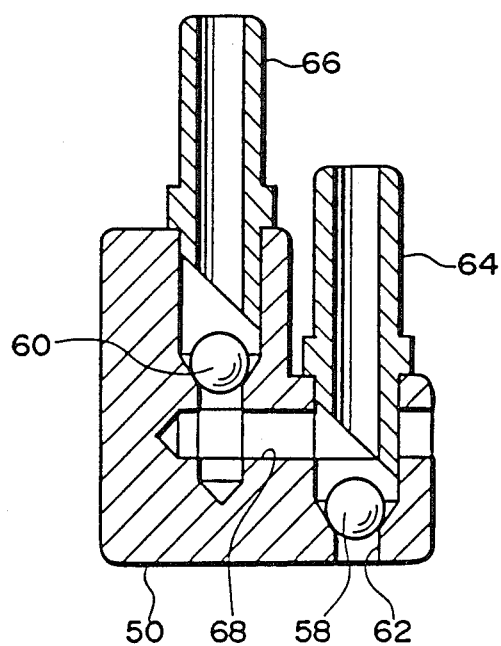
FIG. 4 is a cross-sectional view showing the developer sucking portion incorporated in the automatic developing machine according to the present invention.

As shown in FIG. 4, check valve members 58 and 60 each having a ball-like form are accommodated in the replenishing-solution sucking portion 50 which is disposed in the replenishing solution charged in the replenishing-solution tank 45. The check valve member 58 is arranged to open and close a suction port 62, and the check valve member 60 is arranged to open and close a channel 68 which provides communication between the pipe 64 and the pipe 66.

As shown in FIG. 1, the control section 34 is constituted including a CPU 78, an input port 70, an output port 72, a ROM 74, and a RAM 76. The film sensor 80 and the lower-level sensor 49 are connected to the input port 70, and the output port 72 is connected to the alarm 53 through a drive circuit 79 and to the motor 48 for driving the bellows pump 46 to supply the replenishing solution. A meter 81 is connected to the output port 72 through the device circuit 79.

Figure 5A:
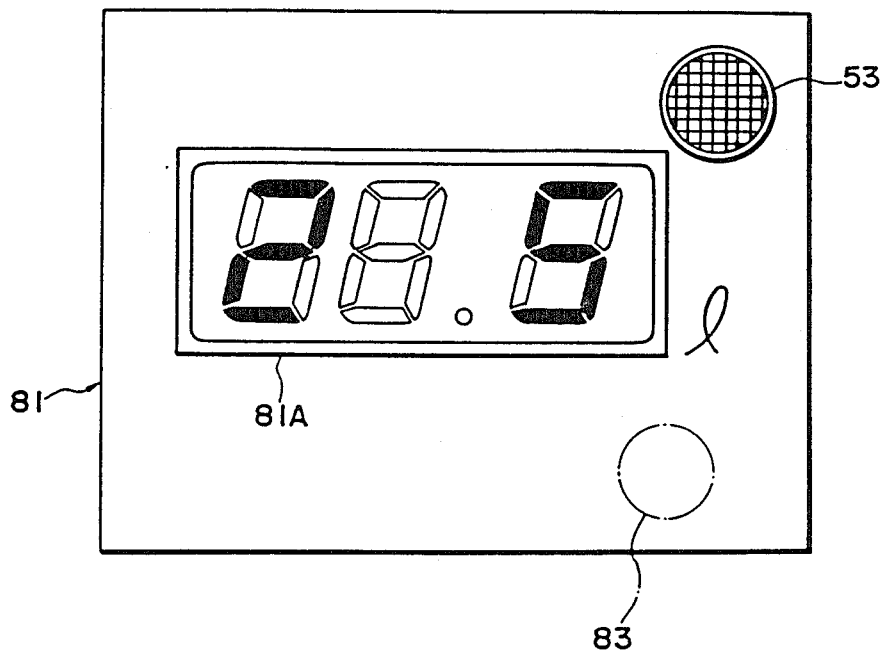
FIG. 5A is a front elevational view of a meter in digital form and its periphery in the present invention

Referring to FIG. 5A, the meter 81 is provided with a liquid crystal display (LCD) 81A for providing a liquid crystal indication representing a quantity R of replenishing solution remaining in the replenishing-solution tank 45. The alarm 53 mentioned previously is attached to a portion of the casing of the meter 81. The quantity R of replenishing solution remaining is calculated at predetermined time intervals by the CPU 78. More specifically, the ROM 74 previously stores in table form the quantities of developer used that correspond to the area S of film processed. The quantity of replenishing solution supplied to the developing tank 18 is equal to the quantity of replenishing solution used. Accordingly, the quantity R of replenishing solution remaining can be obtained by subtracting a quantity F representing the amount of replenishing solution supplied to the developing tank 18 in correspondence with the area S of film processed by the automatic developing machine 10 for a predetermined period from the quantity (or upper level) P representing the amount of replenishing solution initially supplied to the replenishing-solution tank 45:

$$R = P - F \quad (1)$$

If it is desired to supply the replenishing solution to the replenishing-solution tank 45 during the operation of the automatic developing machine 10, the remaining quantity R can be obtained by subtracting a quantity F′ representing the amount of replenishing solution supplied to the developing tank 18 in correspondence with an area S′ of film processed from the time of the actuation of the alarm 53 until the completion of supply of the replenishing solution from the quantity (or upper level) P representing the amount of replenishing solution initially supplied to the replenishing-solution tank 45:

$$R = P - F' \quad (1)'$$

The areas S and S′ of film processed can be readily obtained by multiplying a width W of film detected by the film sensor 80 by a film feed speed V previously stored in the ROM 74:

$$F = S \times V \quad (2),$$

$$F' = S \times V \quad (2)'$$

The operation of the presently preferred embodiment will be described below.

Electric power is supplied to the automatic developing machine 10 and an unprocessed film is inserted from the film insertion table 14. When the unprocessed film passes the area below the film sensor 80, the film sensor 80 detects the passage of the film and inputs a detection signal to the input port of the control section 34.

When passed the area below the film sensor 80, the unprocessed film is fed along the film feed passage formed by the guide rollers 18A arranged in the developing tank 18, and is guided to the bottom portion of the developing tank 18. The thus-guided film is reversed by the guide rollers 18A arranged in the bottom portion and fed to the top portion of the developing tank 18. In this manner, the unprocessed film is passed through the developer for a predetermined period of time, and is thus developed.

The film developed is further guided to the fixing tank 20 by the plurality of guide rollers 20A, and is fixed in the fixing tank 20. Then, the fixed film is washed while it is passing through the film feed passage formed by the plurality of guide rollers 22A arranged in the washing tank 22. The washed film passes through the drying section 24 while being guided by the guide rollers 24A, and drying of the film is effected in the drying section 24. The film thus dried is stored in the film stocker 16.

The developing tank 18 is periodically supplied with the replenishing solution from the replenishing-solution tank 45. The replenishing solution is supplied in accordance with the quantity of film processed (the area S of film processed). More specifically, when the width W of the unprocessed film which has been obtained by the film sensor 80 is supplied to the control section 34, the CPU 78 reads out the film feed speed V stored in the ROM 74 and calculates the area S of film processed (W × V). The quantity of developer used in correspondence with the area S is selected from the data which is stored in the ROM 74 in table form. The motor 48 is driven to actuate the bellows pump 46A, thereby supplying the selected quantity of replenishing solution. Thus, the developing tank 18 is charged with an optimum quantity of developer.

If the above-described supply is repeated, the quantity of replenishing solution will decrease in the replenishing-solution tank 45 until the quantity of replenishing solution in the replenishing-solution tank 45 will reach the lower level. When the lower-level sensor 49 detects the fact that the quantity of replenishing solution has reached the lower level, the CPU 78 causes the alarm 53 to generate an alarm sound. Thus, the operator prepares a predetermined quantity of replenishing solution and supplies it to the replenishing-solution tank 45. Therefore, the replenishing-solution tank 45 is prevented from emptying.

In the present embodiment, it is also possible to detect the quantity of replenishing solution remaining in the replenishing-solution tank 45 and indicate the detection quantity by means of the meter 81. Methods of effecting the detection will be described with reference to the flow charts shown in FIGS. 6 and 7.

Figure 6:
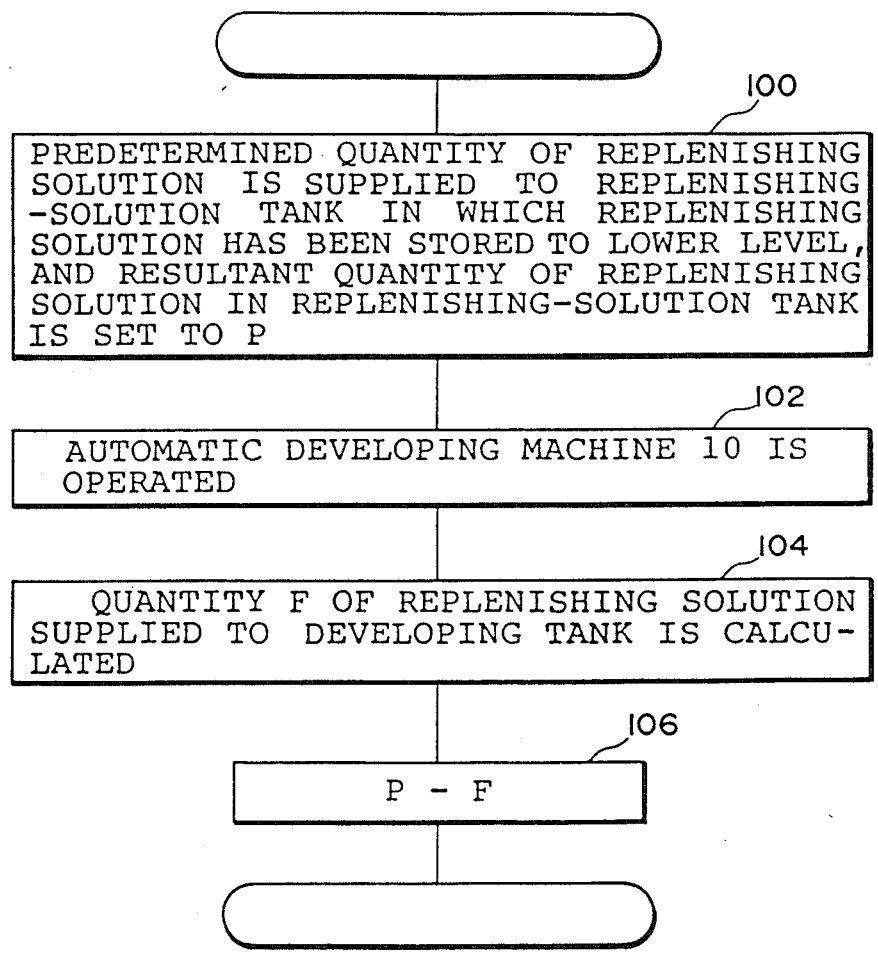
FIG. 6 is a flow chart showing a first method of detecting the remaining quantity of replenishing solution in accordance with the present invention.

A first method will be described with reference to FIG. 6.

First, prior to operating the automatic developing machine 10, the quantity of replenishing solution then stored in the replenishing-solution tank 45 is set as the lower level. In Step 100, a predetermined quantity of replenishing solution is supplied in this state, and the resultant quantity P of replenishing solution stored in the replenishing-solution tank 45 is set as the upper level and is stored in the RAM 76 of the control section 34.

In this state, the automatic developing machine 10 is operated in Step 102. In Step 104, the width W of the film is supplied to the control section 34, and the quantity F of replenishing solution supplied is calculated from the above equation (2). In Step 106, the quantity F of replenishing solution calculated is subtracted from the quantity P of replenishing solution stored in the replenishing-solution tank 45 (P - F).

Figure 7:
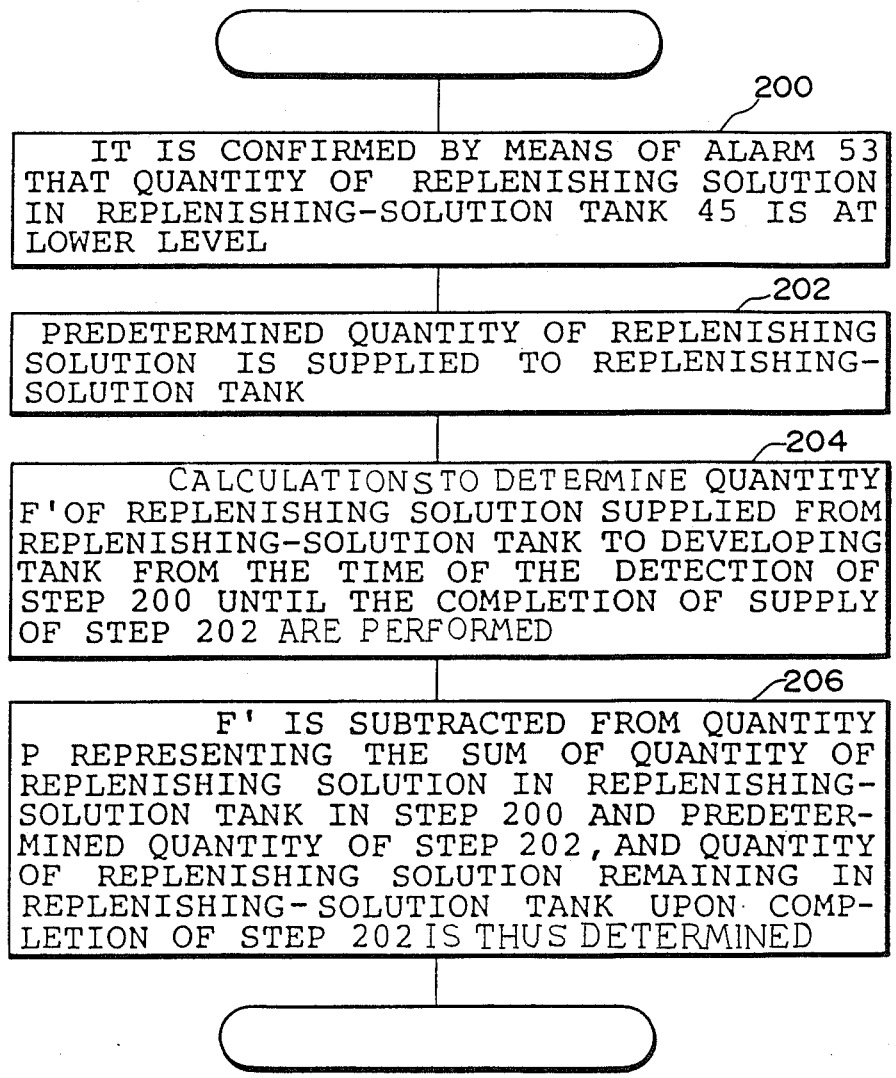
FIG. 7 is a flow chart showing a second method of detecting the remaining quantity of replenishing solution in accordance with the present invention.

A second detection method will be described below with reference to FIG. 7.

When it has been confirmed in Step 200 by the alarm sound generated by the alarm 53 that the quantity of replenishing solution in the replenishing-solution tank 45 has reached the lower level, the process proceeds to Step 202. In Step 202, a predetermined quantity of replenishing solution is supplied to the replenishing-solution tank 45 which is in the state described above. During this time, since the automatic developing machine 10 is operating, the quantity of replenishing solution in the replenishing-solution tank 45 decreases, by the quantity F' of supply which is calculated from the above equation (2') and as indicated in step 204, by the time that the supply of the replenishing solution to the replenishing-solution tank 45 has been completed. The quantity F' of supply is subtracted from the quantity P of replenishing solution initially supplied to the replenishing solution tank 45 which quantity P is previously stored in the RAM 76 (P−F'). Since the result of these calculations, illustrated in step 206, (the remaining quantity R) is indicated by the meter 81, it is possible to visually confirm the quantity of replenishing solution remaining in the replenishing-solution tank 54 without the need to directly view the replenishing-solution tank 45. Furthermore, the readings indicative of the remaining quantity do not include any error since they are calculated employing an equation identical with the equation used for calculating the quantity of replenishing solution supplied to the developing tank by the driving of the bellows pump 46. If account is taken of the quantity of supply so as to compensate for the deterioration of the solution due to air, further accurate results can be obtained.

As described above, in the presently preferred embodiment, the remaining quantity of replenishing solution is calculated from the result obtained from the quantity of film processed. Therefore, it is unnecessary that cuts representative of a scale be formed in the replenishing-solution tank 45 made of a transparent or translucent material, and hence the production cost of the replenishing-solution tank 45 can be reduced. In addition, since there is no risk that an operator may misidentify the remaining quantity because of his misreading of a liquid level due to the contaminated scale of the replenishing-solution tank 45, the operability of the replenishing-solution tank 45 is improved. Moreover, since it is unnecessary to expose any portion (the scale) of the replenishing-solution tank 45 to the outside of the automatic developing machine 10, the freedom of design in the layout of the replenishing-solution tank 45 widens and this enables the automatic developing machine 10 itself to be made compact.

Figure 5B:
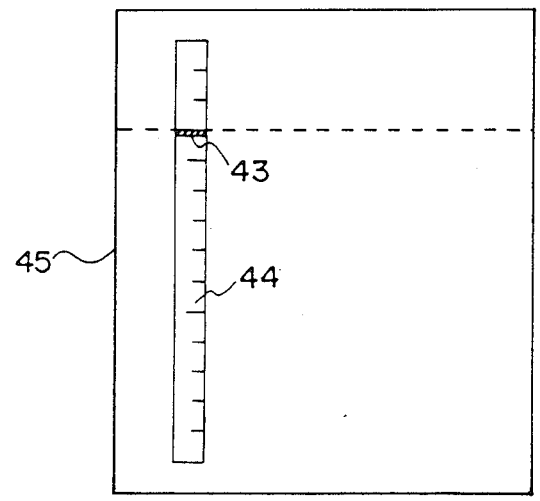
FIG. 5B is a front elevational view of a meter in analog form provided on a replenishing-solution tank.

In the present embodiment, the meter 81 for displaying the remaining quantity of replenishing solution is constituted by a so-called digital display meter which displays figures themselves in liquid crystal form. However, it is possible to use any other type of meter, for example, a so-called analog display meter as shown in FIG. 5B in which an indicating needle 43 moves over an equally graduated plate 44.

The digital meter 81 used in the present embodiment is arranged to display the remaining quantity of replenishing solution at any time. However, as shown by an imaginary line in FIG. 5A, an operation button 83 may be disposed at an arbitrary location around the meter 81 so that the remaining quantity may be displayed by operating the operation button 83 only when required.

By way of example, the description of the present embodiment refers to a method of displaying the remaining quantity of replenishing solution. However, if a replenishing-solution tank for another replenishing solution (for example, a fixing solution) is incorporated in the automatic developing machine 10, the present invention can also be applied to such a replenishing-solution tank.

In the present embodiment, the quantity of replenishing solution in the replenishing-solution tank 45 is detected as the lower level by the lower-level sensor 49 and a predetermined quantity of replenishing solution is added to the replenishing solution of this lower level, and the quantity of replenishing solution then supplied is stored as the upper level. However, an upper-level graduation may also be formed on the replenishing-solution tank 45 and the replenishing solution may be supplied to the position of the upper-level graduation. Since this graduation indicates the upper-level position, there is no risk that an operator may misread this graduation.

Moreover, the displaying of the remaining quantity of replenishing solution may be started when the alarm 53 starts up in response to the signal of the lower-level sensor 49.

In the present embodiment, the remaining quantity is displayed as the quantity of replenishing solution actually remaining in the replenishing-solution tank 45. Furthermore, the lower level may be set to a zero quantity, and the quantity below the lower level may be displayed as minus values.

What is claimed is:

1. A method of detecting the quantity of replenishing solution remaining in a replenishing-solution tank in an automatic developing machine, which tank is adapted to supply a quantity of replenishing solution to a processing tank for processing a light sensitive material, wherein said quantity of replenishing solution supplied to said processing tank is calculated on the basis of the quantity of said light sensitive material processed, comprising the steps of:

(a) subtracting the quantity of replenishing solution supplied to said processing tank from a storage quantity representing the amount of replenishing solution stored in said replenishing-solution tank; and (b) detecting the value of said subtraction as the quantity of replenishing solution remaining in said replenishing solution tank.

2. The method according to claim 1 further comprising the step of displaying said quantity of replenishing solution remaining as a step following said Step (b).

3. The method according to claim 2, wherein said display is provided in analog form.

4. The method according to claim 2, wherein said display is provided in digital form.

5. The method according to claim 1, wherein said storage quantity is obtained as the sum of the quantity of replenishing solution stored to a predetermined level in said replenishing-solution tank and a predetermined quantity of replenishing solution added to said replenishing solution stored in said replenishing-solution tank.

6. The method according to claim 5, wherein said quantity of replenishing solution supplied to said processing tank is obtained by multiplying the quantity of replenishing solution required to process unit area of said light sensitive material by the area of said light sensitive material processed.

7. The method according to claim 6, wherein said level is a lower level representative of the fact that the quantity of replenishing solution in the replenishing-solution tank has reached a liquid level which requires re-supply of said replenishing solution.

8. The method according to claim 7, wherein said quantity of replenishing solution supplied to said processing tank includes the quantity of replenishing solution which is supplied from said replenishing-solution tank to said processing tank from the time that said replenishing solution in said replenishing-solution tank has reached said lower level until said predetermined quantity of replenishing solution has been supplied to said replenishing-solution tank.

9. The method according to claim 8, comprising the additional step of generating an alarm when said quantity of replenishing solution in said replenishing-solution tank has reached said lower level.

10. A method of detecting the quantity of replenishing solution remaining in a replenishing-solution tank in an automatic developing machine, which tank is adapted to supply a quantity of replenishing solution to a processing tank for processing a light sensitive material, wherein said quantity of replenishing solution supplied to said processing tank is calculated on the basis of the quantity of said light sensitive material processed, comprising the steps of:

(a) detecting the fact that the quantity of replenishing solution in said replenishing-solution tank has reached a level which requires re-supply of said replenishing solution to said replenishing-solution tank;

(b) supplying a predetermined quantity of replenishing solution to said replenishing-solution tank;

(c) subtracting the quantity of replenishing solution supplied to said processing tank from a storage quantity consisting of the quantity of replenishing solution corresponding to said level and said predetermined quantity of replenishing solution supplied; and (d) detecting the value of said subtraction as the quantity of replenishing solution remaining in said replenishing-solution tank.

11. The method according to claim 10 further comprising the step of displaying said quantity of remaining replenishing solution on an external portion of said replenishing-solution tank, as a step following said Step (d).

12. The method according to claim 11, wherein said display is provided in analog form.

13. The method according to claim 11, wherein said display is provided in digital form.

14. The method according to claim 10, wherein said storage quantity is obtained as the sum of the quantity of replenishing solution stored to a predetermined level in said replenishing-solution tank and a predetermined quantity of replenishing solution added to said replenishing solution stored in said replenishing-solution tank.

15. The method according to claim 14, wherein said quantity of replenishing solution supplied to said processing tank is obtained by multiplying the quantity of replenishing solution required to process a unit area of said light sensitive material by the area of said light sensitive material processed.

16. The method according to claim 15, wherein said quantity of said replenishing solution supplied to said processing tank includes the quantity of replenishing solution which is supplied from said replenishing-solution tank to said processing tank from the time that said replenishing solution in said replenishing-solution tank has reached said lower level until said predetermined quantity of replenishing solution has been supplied to said replenishing-solution tank.

17. The method according to claim 16, comprising the additional step of generating an alarm when said quantity of replenishing solution in said replenishing-solution tank has reached said lower level.

* * * * *